US007003042B2

(12) United States Patent
Morelos-Zaragoza et al.

(10) Patent No.: US 7,003,042 B2
(45) Date of Patent: Feb. 21, 2006

(54) COMMUNICATION SYSTEM TRANSMITTING ENCODED SIGNAL USING BLOCK LENGTHS WITH MULTIPLE INTEGRAL RELATIONSHIP

(75) Inventors: Robert Morelos-Zaragoza, Tokyo (JP); Francis Swarts, Tokyo (JP)

(73) Assignee: Sony Corporation, Tokyo (JP)

( * ) Notice: Subject to any disclaimer, the term of this patent is extended or adjusted under 35 U.S.C. 154(b) by 858 days.

(21) Appl. No.: 09/918,129

(22) Filed: Jul. 30, 2001

(65) Prior Publication Data
US 2002/0054607 A1    May 9, 2002

(30) Foreign Application Priority Data
Jul. 31, 2000    (JP) ............................ P2000-231826

(51) Int. Cl.
*H04B 14/04*    (2006.01)
(52) U.S. Cl. ................. 375/253; 375/246; 375/240.23; 714/779; 341/67
(58) Field of Classification Search ................ 375/219, 375/141, 240.23, 240.24, 135, 146, 253, 375/261, 262, 242, 265, 298, 259, 224, 285, 375/296, 346, 246; 714/779, 786, 792, 794; 341/67
See application file for complete search history.

(56) References Cited

U.S. PATENT DOCUMENTS

| 5,235,623 | A | * | 8/1993 | Sugiyama et al. | 375/241 |
| 5,686,916 | A | * | 11/1997 | Bakhmutsky | 341/67 |
| 5,990,812 | A | * | 11/1999 | Bakhmutsky | 341/67 |
| 6,031,827 | A | * | 2/2000 | Rikkinen et al. | 370/330 |
| 6,226,608 | B1 | * | 5/2001 | Fielder et al. | 704/229 |
| 6,785,323 | B1 | * | 8/2004 | Proctor, Jr. | 375/146 |

FOREIGN PATENT DOCUMENTS

JP    10-224228    *  8/1998

* cited by examiner

Primary Examiner—Temesghen Ghebretinsae
(74) Attorney, Agent, or Firm—Jay H. Maioli

(57) ABSTRACT

A communication system for performing transmission and reception of a signal over a communication channel assesses a state of the communication channel and produces channel state information accordingly. A block length selector selects block lengths that are dependent on the channel state information and that are selected from a group of block lengths having an integral multiple relationship to produce a schedule of block lengths. Encoding and decoding is performed based on the schedule of block lengths.

4 Claims, 5 Drawing Sheets

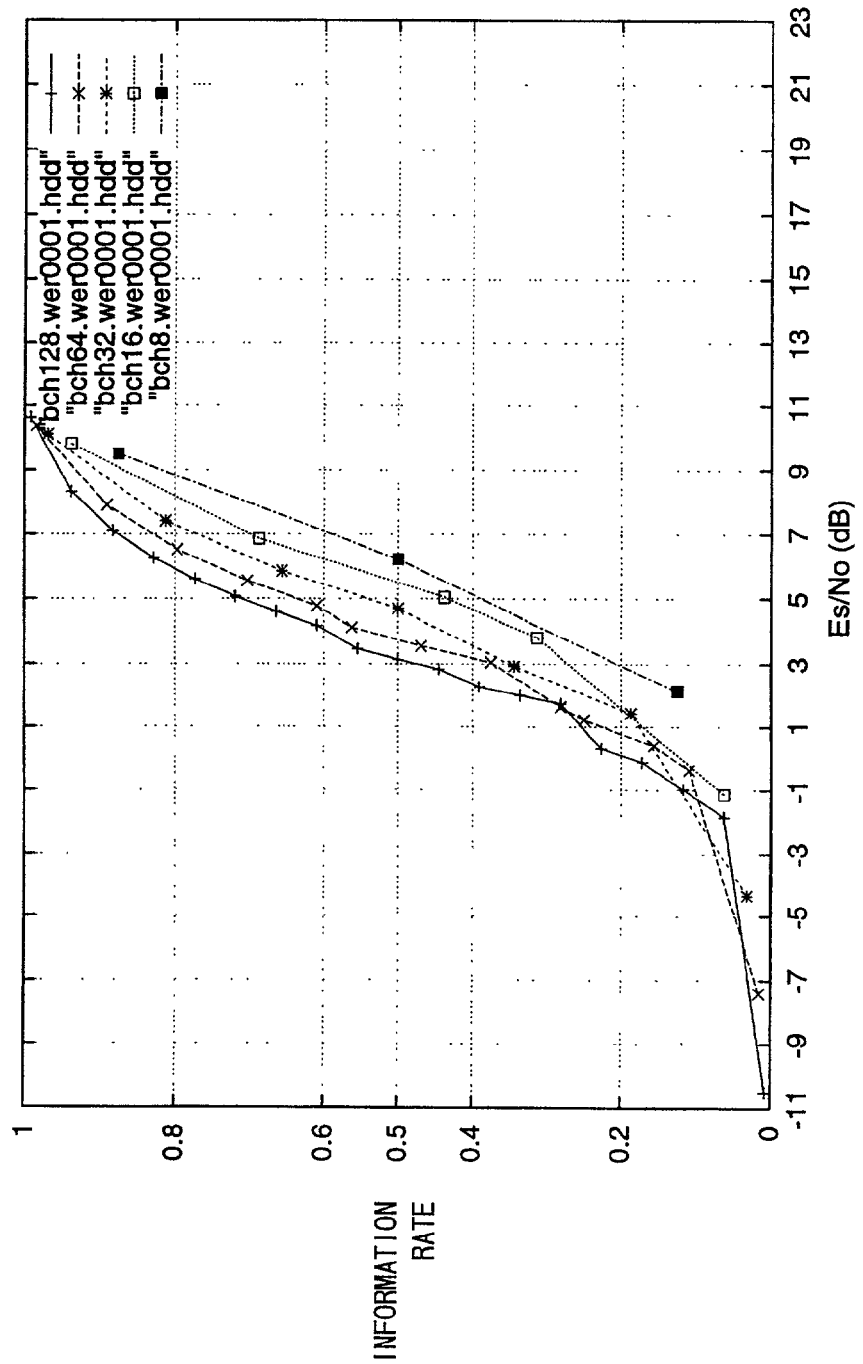

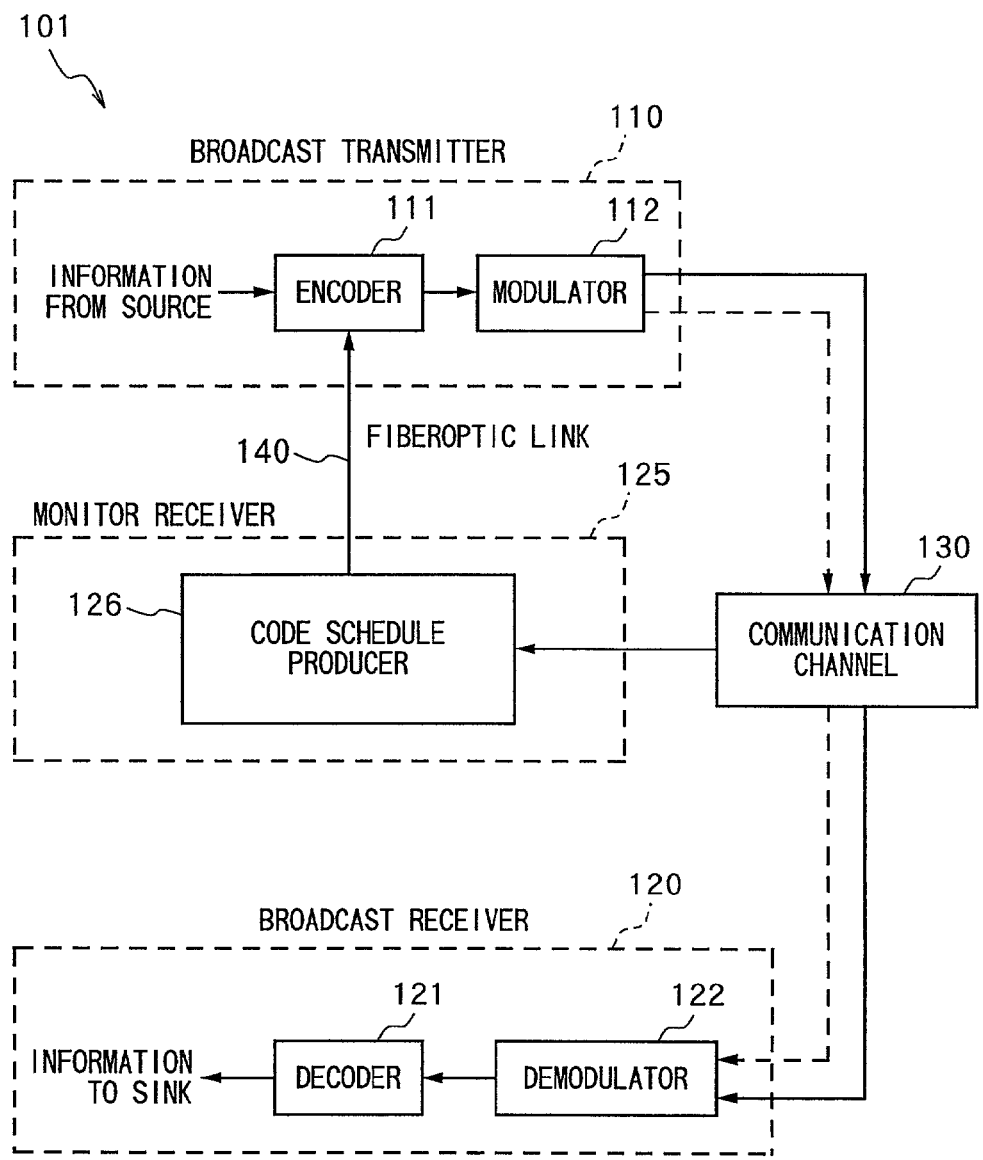

COMMUNICATION SYSTEM TRANSMITTING ENCODED SIGNAL USING BLOCK LENGTHS WITH MULTIPLE INTEGRAL RELATIONSHIP

BACKGROUND OF THE INVENTION

1. Field of the Invention

The present invention relates to a communication system transmitting an encoded signal across a channel with noise and fading.

2. Description of the Related Art

A communication system includes a transmitter and a receiver connected by a communication channel. In a wireless communication system, especially a mobile wireless communication system, the condition of the communication channel can change rapidly. The capacity of the channel varies with the channel condition. That is, the channel can hold more information when channel conditions are good, and less information when conditions are bad. If the transmitter and receiver are designed with parameters fixed to levels that assume less than optimal channel conditions, then they will not use the full capacity of the communication channel when the channel conditions approach the optimum channel conditions.

For example, radio waves propagate between the transmitter and the receiver in a manner that causes level of the signal received by the receiver to fluctuate constantly. This is known as fading. The signal-to-noise ratio (SNR) of the channel fluctuates in accordance with fading. The capacity of the channel fluctuates with variation in the SNR. That is, whenever the SNR improves, the capacity of the channel increases, and whenever the SNR decreases, the capacity of the channel decreases.

In order to best make use of the capacity of the channel, the information rate, that is, the rate of information transfer, should match the channel capacity. In a fixed information rate system, the information rate is set assuming poor channel conditions so as not to risk losing information. As a result, some of the full capacity of the channel will be wasted whenever fading condition improve to better than the assumed poor channel conditions.

Adaptive communication systems have been proposed that instantaneously monitor the channel conditions, and change various transmission parameters depending on the present channel state in order to maximize efficiency of transmission.

For example, U.S. Pat. No. 5,907,563, based on foreign priority to Japanese Patent Application No. 8-078157, discloses a wireless data communication apparatus that changes error control method based on the channel conditions. That is, during data communication, the apparatus observes various condition parameters, such as fading period, delay variance, and propagation level ratio of line-of-sight and trans horizon, to judge the condition of the wireless transmission channel. The apparatus then selects an error control strategy, such as protocol, block length, and parity length, according to the channel condition.

For example, when the system detects transmission channel conditions of fading period: 20, delay variance: 0.5, and propagation level ratio: 100, then the system will select an error control strategy of Bose Chauduri Hocquenghem (BCH) code as the protocol, a block length of 100 symbols, and a parity length of 10 symbols. On the other hand, when detected transmission channel conditions include a fading period of 50, a delay variance of 0.1, and a propagation level ratio of 0, then the selected error control strategy includes Solomon Reed (SR) code as the protocol, a block length of 150 symbols, and a parity length of 30 symbols.

SUMMARY OF THE INVENTION

According to the system of U.S. Pat. No. 5,907,563, if the transmission channel conditions change from the former to the later conditions during data communication, then the transmitter will change block length from 100 to 150 symbols.

However, a change in block length changes the transmission rate. To the receiver, this will appear as though the boundaries of the information train have shifted. For example, the receiver will receive the header of a frame at a different time than expected.

When the receiver does not find particular information where expected, the receiver will perform a fairly complex and time consuming synchronization operation. Alternatively, the transmitter can insert redundant symbols (a type of "symbol stuffing") in the frame to keep the frame length, and consequently the transmission rate, constant. However, it is desirable to transmit only useful data, rather than such redundant symbols.

It is conceivable that the system be designed with a frame length that is a common multiple of all the possible block lengths. However, this would greatly limit frame sizes that the system could use. That is, the system of U.S. Pat. No. 5,907,563 discloses using three different possible block lengths of 100, 150, and 200 symbols. Therefore, the frame length would be restricted to a common multiple of all these block lengths, for example 600 symbols, 1,200 symbols, and the like. Moreover, the system would require a great deal of memory to handle such large frames.

It is an objective of the present invention to provide a transmission system, transmitter, receiver, and method capable of varying block length depending on the present conditions of the transmission link, without requiring complex resynchronization operations, or symbol stuffing or long frames to maintain a constant transmission rate.

In order to achieve the above-described objective, a transmitter according to the present invention includes a block length selector, an encoder, and an interface. The block length selector receives channel state information about state of a communication channel, and selects block lengths that are dependent on the channel state information and that are selected from a group consisting of block lengths having an integral multiple relationship, to produce a schedule of block lengths. The encoder receives information from a source and the schedule of block lengths from the block length selector, and encodes the information from the source into an encoded signal using the schedule of block lengths. The interface transmits the encoded signal over the communication channel.

With this configuration, because the block length selector selects block lengths from a group of block lengths with an integral relationship, information rate and block length can be easily changed. As a result, the overall rate of reliable information transmitted through a fading channel can be maximized.

Also, the block length can be changed while maintaining a constant channel transmission rate. Therefore, complex and time consuming synchronization operations can be reduced.

Also, each block length enables a number of different information rates. Therefore, by being able to select block length, the variety of selectable information rates increases.

This results in an overall improvement in code information granularity, that is, the information rate granularity becomes finer.

It is desirable that the block length selector assembles the block lengths in the schedule of block lengths in frames that each total a maximum block length. With this configuration, frame synchronization is simple.

According to another aspect of the present invention, a receiver for receiving a signal transmitted over a communication channel, includes a block length selector, an interface, and a decoder. The block length selector receives channel state information about state of the communication channel, and selects block lengths that are dependent on the channel state information and that are selected from a group consisting of block lengths having an integral multiple relationship, to produce a schedule of block lengths. The interface receives the signal from the communication channel. The decoder receives the signal from the interface and the schedule of block lengths produced by the block length selector, and decodes the signal using the schedule of block lengths.

With this configuration, because the block length selector selects block lengths from a group of block lengths with an integral relationship, information rate and block length can be easily changed. As a result, the overall rate of reliable information transmitted through a fading channel can be maximized.

Also, a constant channel transmission rate will be maintained even when the block length changes. Therefore, the receiver receives a signal with a fixed transmission rate. Since the receiver does not need to be adjustable for varying transmission rates caused by mismatches in block length, the receiver can be less complex and less costly. Also, complex and time consuming synchronization operations can be reduced.

Also, each block length enables a number of different information rates. Therefore, by being able to select block length, the variety of selectable information rates increases. This results in an overall improvement in code information granularity, that is, the information rate granularity becomes finer.

It is desirable that the receiver further include a channel state estimator that assesses state of the channel based on the signal from the communication channel, and produces the channel state information accordingly. With this configuration, there is no need to provide a separate apparatus for providing the channel state information.

It is desirable that the receiver further include a channel state predictor that makes predictions on future conditions of the communication channel based on the channel state information from the channel state estimator. In this case, the block length selector produces the schedule of block lengths based on the predictions so that the schedule of block lengths will better suit the state of the channel.

According to another aspect of the present invention, a communication system for performing transmission and reception of a signal over a communication channel, includes a channel state estimator, a block length selector, a transmitter, and a receiver. The channel state estimator assesses the state of the communication channel, and produces channel state information accordingly. The block length selector receives channel state information from the channel state estimator, and selects block lengths that are dependent on the channel state information and that are selected from a group consisting of block lengths having an integral multiple relationship, to produce a schedule of block lengths.

The transmitter has an encoder and a transmission interface. The encoder receives information from a source and the schedule of block lengths from the block length selector, and encodes the information from the source into an encoded signal using the schedule of block lengths. The transmission interface transmits the encoded signal over the communication channel. The receiver has a reception interface and a decoder. The reception interface receives the encoded signal from the transmission interface across the communication channel. The decoder receives the encoded signal from the reception interface and the schedule of block lengths produced by the block length selector, and decodes the signal using the schedule of block lengths.

With this configuration, the block length selector selects block lengths from a group of block lengths with an integral relationship. Therefore, information rate and block length can be easily changed. As a result, the overall rate of reliable information transmitted through a fading channel can be maximized.

The block length can be changed while maintaining a constant channel transmission rate. Therefore, the receiver need not be a receiver with variable transmission rate. Since it does not need to be adjustable for varying transmission rates caused by mismatches in block length, the receiver is less complex and less costly. Also, complex and time consuming synchronization operations can be reduced.

Also, each block length enables a number of different information rates. Therefore, by being able to select block length, the variety of selectable information rates increases. This results in an overall improvement in code information granularity, that is, the information rate granularity becomes finer.

It is desirable that the channel state estimator of the communication system be provided in the receiver, and the block length selector be provided in both the transmitter and the receiver. In this case, the channel state estimator sends the channel state information to the block length selector in the transmitter across a feedback channel, and sends the channel state information to the block length selector in the transmitter. With this configuration, the amount of data transmitted across the feedback channel can be reduced.

It is also desirable that the receiver and transmitter of the communication system both further include a channel state predictor for making predictions on future conditions of the communication channel based on the channel state information from the channel state estimator. In this case, the block length selectors of the receiver and of the transmitter produce the schedule of block lengths based on the predictions. With this configuration, the amount of data transmitted across the feedback channel can be reduced.

It is desirable that the block length selector assembles the block lengths in the schedule of block lengths in frames that each total a maximum block length. With this configuration, the frame synchronization is simple.

According to another aspect of the present invention, a method of transmitting a signal over a communication channel, includes: receiving channel state information about state of the communication channel; selecting block lengths that are dependent on the channel state information and that are selected from a group consisting of block lengths having an integral multiple relationship, to produce a schedule of block lengths; receiving information from a source; encoding the information from the source into an encoded signal using the schedule of block lengths; and transmitting the encoded signal over the communication channel.

By transmitting according to this method, because block lengths are selected from a group of block lengths with an integral relationship, the information rate and block length can be easily changed. As a result, the overall rate of reliable information transmitted through a fading channel can be maximized.

Also, a constant channel transmission rate will be maintained even when the block length changes. Therefore, complex and time consuming synchronization operations can be reduced.

Also, each block length enables a number of different information rates. Therefore, by being able to select block length, the variety of selectable information rates increases. This results in an overall improvement in code information granularity, that is, the information rate granularity becomes finer.

According to another aspect of the present invention, a method of receiving a signal transmitted over a communication channel includes: receiving channel state information about state of the communication channel; selecting block lengths that are dependent on the channel state information and that are selected from a group consisting of block lengths having an integral multiple relationship, to produce a schedule of block lengths; receiving the signal from the communication channel; and decoding the signal using the schedule of block lengths.

By receiving according to this method, because block lengths are selected from a group of block lengths with an integral relationship, information rate and block length can be easily changed. As a result, the overall rate of reliable information transmitted through a fading channel can be maximized.

Also, a constant channel transmission rate will be maintained even when the block length changes. Therefore, a receiver that operates according to this method receives a signal with a fixed transmission rate. Since the receiver does not need to be adjustable for varying transmission rates caused by mismatches in block length, the receiver can be less complex and less costly. Also, complex and time consuming synchronization operations can be reduced.

Also, each block length enables a number of different information rates. Therefore, by being able to select block length, the variety of selectable information rates increases. This results in an overall improvement in code information granularity, that is, the information rate granularity becomes finer.

According to another aspect of the present invention, transmission and reception of a signal over a communication channel is performed by: assessing state of the communication channel, and producing channel state information accordingly; selecting block lengths that are dependent on the channel state information and that are selected from a group consisting of block lengths having an integral multiple relationship, to produce a schedule of block lengths; receiving information from a source; encoding the information from the source into an encoded signal using the schedule of block lengths; transmitting the encoded signal over the communication channel; receiving the encoded signal from across the communication channel; and decoding the encoded signal using the schedule of block lengths.

By performing transmission and reception according to this method, because block lengths are selected from a group of block lengths with an integral relationship, information rate and block length can be easily changed. As a result, the overall rate of reliable information transmitted through a fading channel can be maximized.

Also, a constant channel transmission rate will be maintained even when the block length changes. Therefore, a receiver that operates according to this method receives a signal with a fixed transmission rate. Since the receiver does not need to be adjustable for varying transmission rates caused by mismatches in block length, the receiver can be less complex and less costly. Also, complex and time consuming synchronization operations can be reduced.

BRIEF DESCRIPTION OF THE DRAWINGS

The above and other objects, features and advantages of the invention will become more apparent from reading the following description of the embodiment taken in connection with the accompanying drawings in which:

FIG. 6 is a graph showing information rates possible using hard-decision MLD of extended BCH codes of lengths 8, 16, 32, 64, and 128 bits; and FIG. 7 is a block diagram showing a broadcasting system according to a second embodiment of the present invention.

DETAILED DESCRIPTION OF THE EMBODIMENTS

A communication system according to embodiments of the present invention will be described while referring to the accompanying drawings.

Figure 1:
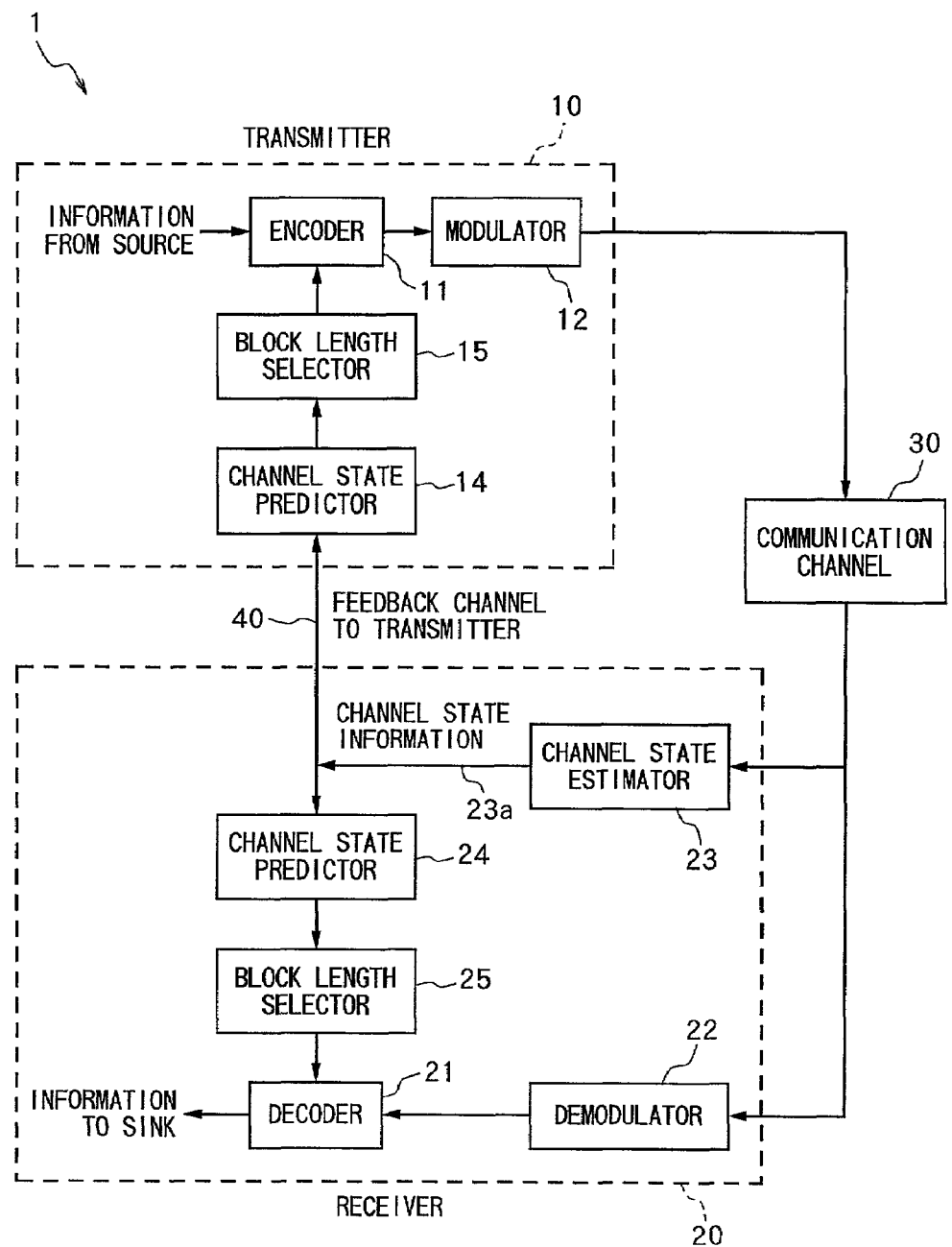
FIG. 1 is a functional block diagram showing a communication system according to a first embodiment of the present invention.

FIG. 1 is a functional block diagram showing a transmission system 1 according to a first embodiment. The transmission system 1 includes a transmitter 10 and a receiver 20. The transmitter 10 transmits information to the receiver 20 across a communication channel 30, which includes noise and fading.

The transmitter 10 includes an encoder 11, a modulator 12, a channel state predictor 14, and a block length selector 15. The encoder 11 receives information from a source, and encodes the information. The encoder 11 outputs the source information in encoded form to the modulator 12. The modulator 12 modulates the encoded signal from a base band up to a carrier band and transmits it across the communication channel 30.

The receiver 20 includes a decoder 21, a demodulator 22, a channel state estimator 23, a channel state predictor 24, and a block length selector 25. The demodulator 22 receives and demodulates the signal from the transmitter 10 from the carrier signal back down to the base band. The decoder 21 receives and decodes the demodulated signal from the demodulator 22, and then transfers the decoded signal to a sink.

The channel state estimator 23 of the receiver 20 receives the signal transmitted from the transmitter 20 over the communication channel 30, and uses it to make an assessment of the present state of the communication channel 30. The channel state estimator 23 according to the embodiment is a Least Mean Squared (LMS) filter, because this is probably the simplest way to extract information about the channel state and predict channel state using the information. However, any method or configuration capable of extracting information about the channel state and predicting channel state can be used.

According to the present embodiment, when the system is started up, the transmitter 10 will send only an unmodulated carrier signal (pilot carrier) for a brief synchronization period. During this time, the channel state estimator 23 of the receiver 20 observes the pilot carrier to accumulate information about the fading condition of the channel. Future fading condition can be predicted based on information about fading and the weights of the LMS filter.

The channel state estimator 23 makes its assessment based on the two parameters of fading depth and fading rate. The fading depth, that is, instantaneous SNR, represents how attenuated the signal level is in the receiver 20. The fading depth is used to determine the information rate. That is, if the fading depth is very large, then many errors can be expected, so a higher coding rate with more redundancy is needed. The fading depth can be determined by measuring the power received at the antenna of the receiver 20.

The fading rate indicates how fast the fading depth changes, and is used to determine the block length. If fading is slow, then longer block lengths can be used safely. However, if the fading level changes very fast, then shorter block lengths are required, because the fading depth might change in the middle of a code word with longer block length so that information is lost. There are many conventional methods for determining fading rate. For example, Fourier transform can be performed on a tone (sinusoidal wave) included in the header of the transmission frame. The Doppler frequency represents the fading rate.

The channel state estimator 23 transmits only raw information about fading and the weights from the LMS filter to the channel state predictor 13 across a feedback channel 40. According to the present embodiment, the feedback channel 40 is a side channel, independent from the communication channel 30, constructed by time division multiplexing or frequency division multiplexing. Because the channel state information that is transmitted across the feedback channel 40 is so important, the channel 40 needs to be very robust, with very strong coding to produce a very low error rate. It should be noted that the feedback channel 40 could be any type of transmission channel, including any wireless or wire channel.

The channel state predictor 14 receives the raw information from the estimator 23, and at a certain point will predict ahead about future conditions of the communication channel 30. The channel state predictor 14 sends these predictions to the block length selector 15.

The block length selector 15 receives the predictions from the predictor 14 and selects the block lengths that correspond to the predictions to produce a schedule of codes including a schedule of block lengths and a schedule of information rates. The block length selector 15 selects the block lengths from a group consisting of block lengths all with an integral relationship to each other. A group consisting of L block lengths $n_1, n_2, \ldots, n_L$ is considered to have an integral relationship, that is, is considered to be length compatible, when it meets the following L−1 conditions:

$n_1|n_2, n_2|n_3, \ldots, n_{\{L-1\}}|n_L$, wherein, for two positive integers a and b, b|a if and only if a=mb, for some positive integer m.

Figure 2:
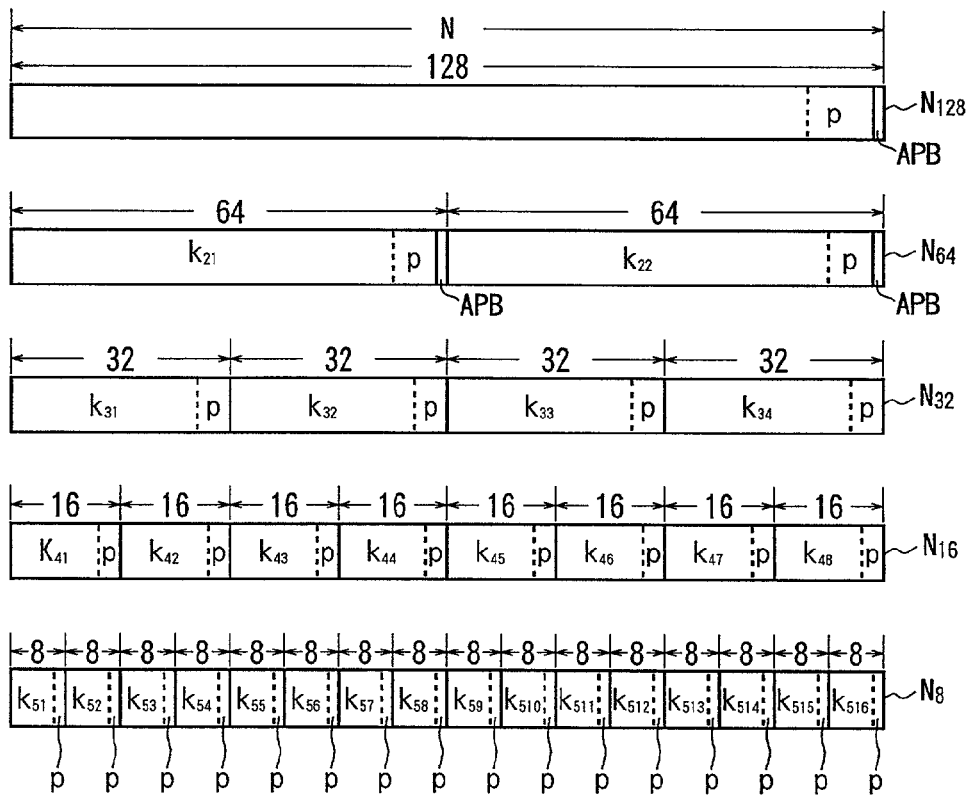
FIG. 2 is a schematic view showing integral relationship of block lengths used in an encoder of the communication system shown in FIG. 1.

According to this definition, a variety of different groups of block lengths can be considered as being length compatible. For example, a group consisting of block lengths 5, 15, and 45 is length compatible, as is a group consisting of block lengths 8, 16, 32, 64, and 128. FIG. 2 shows frames $N_8$, $N_{16}$, $N_{32}$, $N_{64}$, and $N_{128}$ assembled from code words with block lengths of 8, 16, 32, 64, and 128 bits, respectively, as per the later integral relationship.

Each of the block lengths includes a total of $2^{1^1}$ bits, wherein 1 is 3, 4, 5, 6, or 7. The total bits of each code word includes information bits k followed by parity P. The information rate of each code word can be changed by increasing or decreasing the number of information bits k contained in the code word, so that each block length enables a number of different information rates. The notation "$k_{xy}$" indicates the number of information bits k transmitted when a codeword from code x is used to make up the yth subinterval of the frame N presently being assembled.

In the example of FIG. 2, a code word with information bits k and parity P totaling 128 bits is the maximum block length N that can be safely transmitted under the best channel conditions. "Frame" refers to a transmission of successive coded bits in a number equivalent to the maximum block length N.

A code word with a long block length has the capacity to contain a greater proportion of actual information k to parity P than a code word with shorter block length. Therefore, in order to increase the rate of information transfer, that is, the information rate (k/N), it is desirable to use longer block lengths. Whenever possible, the block length selector 14 selects the longest block length that can be safely used under the predicted channel conditions.

According to the embodiment, the block lengths 8, 16, 32, 64, and 128 are produced by extending code words of cyclic block control codes, by addition of an added parity bit APB to the code words. Block error control codes typically have block length $n=2^m-1$, wherein m is an integral number from three on, that is, 3,4,5, . . . , m. By extending each block length by adding a parity bit, the block lengths then have the very favorable integral relationship $2^1$ of the present embodiment. In the example shown in FIG. 2, the Hamming codes of block lengths $2^m-1$, m=3,4, . . . ,7 have been extended by addition of a single parity bit APB, so that the block lengths are compatible. Extension is a commonly used principle in error control coding to match block length with a particular computer architecture. It should be noted that although only block lengths of 128 and 64 bits are shown in FIG. 2 as including an added parity bit APB, all other blocks include an added parity bit APB also.

Figure 3:
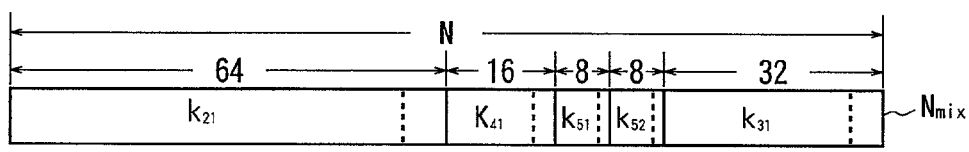
FIG. 3 is a schematic view showing a maximum block length assembled from smaller block lengths with the integral relationship.

The block length selector 15 selects and assembles frames based on the channel state and the maximum block length N. Although the block length selector 15 assembles the frames $N_8$, $N_{16}$, $N_{32}$, $N_{64}$, and $N_{128}$ of FIG. 2 using only a single block length in each frame, the block length selector 15 can assemble each frame using any mix of block lengths that best suits the predicted channel conditions. For example, the block length selector 15 assembles the frame $N_{mix}$ shown in FIG. 3 when the channel state predictor 14 predicts that the channel state will degrade during transmission of the frame $N_{mix}$. In accordance with this, the block length selector 15 selects a fairly long block of 64 bits at the start of the frame $N_{mix}$ when channel conditions are predicted to be fairly good, selects shorter block lengths of 16 and 8 bits where channel state is predicted to degrade, and a block length of 32 bits toward the end of the frame $N_{mix}$ when channel state is predicted to improve. It is therefore clear that a frame can be assembled using any combination of code words, as long as the combination does not exceed the maximum block length N.

In this way, the block length selector 15 selects block lengths from a group of block lengths with an integral relationship. Therefore, information rate and block length can be easily changed. As a result, the overall rate of reliable information transmitted through a fading channel can be maximized.

The block length can be changed while maintaining a constant channel transmission rate. Therefore, the receiver 20 need not be a receiver with variable transmission rate. Since it does not need to be adjustable for varying transmission rates caused by mismatches in block length, the receiver 20 is less complex and less costly. Also, complex and time consuming synchronization operations can be reduced.

Also, each block length enables a number of different information rates. Therefore, by being able to select block length, the variety of selectable information rates increases. This results in an overall improvement in code information granularity, that is, the information rate granularity becomes finer.

Figure 4:
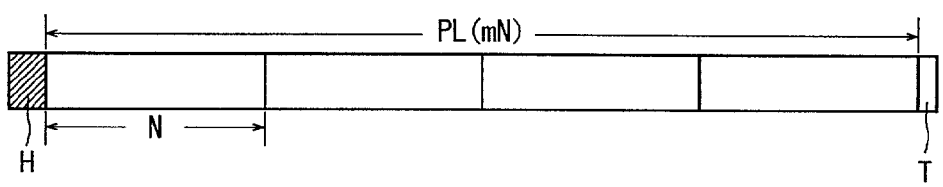
FIG. 4 is a schematic view showing a frame assembled from a plurality of maximum block lengths.
Figure 5:
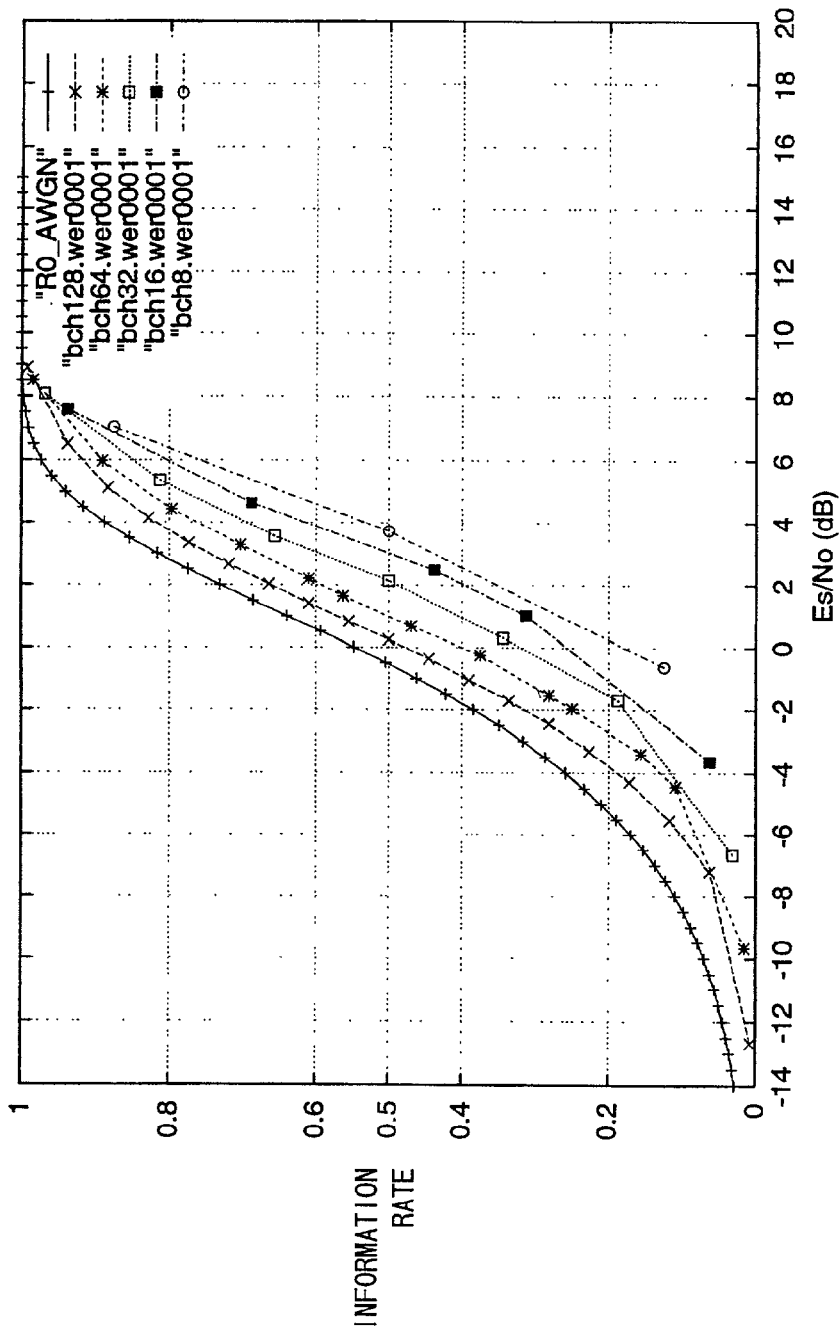
FIG. 5 is a graph showing information rates possible using soft-decision MLD of extended BCH codes of lengths 8, 16, 32, 64, and 128 bits.

The encoder 15 uses the maximum block length N as the basis of transmission frames. As shown in FIG. 4, a transmission frame typically includes a header H, a payload PL with parity, and a trailer T. The encoder 15 assembles the transmission frame so that the payload PL equals an integral multiple of the maximum block length N (PL=mN, wherein m is a positive integer). In the example of FIG. 4, m equals four. It should be noted that m could equal one, wherein the payload PL of the frame would equal the maximum block length N.

The group of integral block lengths could be stored in a memory, such as a ROM or RAM, for example in table form in association with different potential channel states. When stored in table form, the block length selector 15 searches the tables for a channel state that matches the predicted channel state received from the predictor 14, selects the block length in association with the predicted channel condition, and sends the block length to the encoder 11.

Tables 1 to 5 represent examples of tables that the block length selector 15 uses to determine the schedule of codes based on information from the predictor 14. The Tables 1 to 5 relate to extended Bose-Chaudhuri-Hocquenghem (eBCH) codes having lengths 8, 16, 32, 64 and 128, respectively. Each table shows information rates and instantaneous SNR conditions required to achieve a word error rate of $10^{-4}$ for all eBCH codes of the corresponding length. All Tables 1 to 5 show the situation when soft decision maximum-likelihood decoding (SD-MLD) is employed. FIG. 6 shows the same information as in the Tables 1 to 5 in the form of a graph, wherein the vertical axis represents information rate and the horizontal axis represents SNR, using as a reference the cutoff rate of an additive white Gaussian noise (AWGN) channel with binary phase shift keying (BPSK) modulation.

TABLE 1

Block Length 8 (SD-MLD)

| Information Rate | $E_s/N_o$ (dB) |
|---|---|
| 1/8 | −0.6326 |
| 4/8 | 3.7178 |
| 7/8 | 7.0232 |

TABLE 2

Block Length 16 (SD-MLD)

| Information Rate | $E_s/N_o$ (dB) |
|---|---|
| 1/16 | −3.6429 |
| 5/16 | 1.0309 |
| 7/16 | 2.4753 |
| 11/16 | 4.6347 |
| 15/16 | 7.5865 |

TABLE 3

Block Length 32 (SD-MLD)

| Information Rate | $E_s/N_o$ (dB) |
|---|---|
| 1/32 | −6.6532 |
| 6/32 | −1.6914 |
| 11/32 | 0.3019 |
| 16/32 | 2.1353 |
| 21/32 | 3.5557 |
| 26/32 | 5.3603 |
| 31/32 | 9.6875 |

TABLE 4

Block Length 64 (SD-MLD)

| Information Rate | $E_s/N_o$ (dB) |
|---|---|
| 1/64 | −9.6635 |
| 7/64 | −4.4371 |
| 10/64 | −3.3987 |
| 16/64 | −1.9633 |
| 18/64 | −1.5413 |
| 24/64 | −0.2561 |
| 30/64 | 0.6682 |
| 36/64 | 1.6432 |
| 39/64 | 2.2030 |
| 45/64 | 3.2739 |
| 51/64 | 4.4224 |
| 57/64 | 5.9715 |
| 63/64 | 8.5112 |

TABLE 5

Block Length 128 (SD-MLD)

| Information Rate | $E_s/N_o$ (dB) |
|---|---|
| 1/128 | −12.6738 |
| 8/128 | −7.2002 |
| 15/128 | −5.5139 |
| 22/128 | −4.2890 |
| 29/128 | −3.3096 |
| 36/128 | −2.4516 |
| 43/128 | −1.7071 |
| 50/128 | −1.0514 |
| 57/128 | −0.3673 |
| 64/128 | 0.2369 |
| 71/128 | 0.8338 |
| 78/128 | 1.4060 |
| 85/128 | 2.0267 |
| 92/128 | 2.6546 |
| 99/128 | 3.3399 |
| 106/128 | 4.1440 |
| 113/128 | 5.1238 |

TABLE 5-continued

Block Length 128 (SD-MLD)

| Information Rate | $E_s/N_o$ (dB) |
|---|---|
| 120/128 | 6.5043 |
| 127/128 | 8.9060 |

According to the embodiment, when the predictor 14 sends to the block length selector 15, a fading depth (SNR level) and a fading rate predicted for a particular block or frame, the block length selector 15 searches the tables to find all SNRs that are less than the predicted SNR. From these SNRs of all tables, the block length selector 15 extracts from each table the SNR that is nearest to the predicted SNR. The block length selector 15 then uses the fading rate to determine the longest block length that can be used safely considering the channel conditions, and selects the information rate in correspondence with the SNR extracted for that longest block length when assembling the particular block or frame.

For example, if the block length selector 15 receives a prediction that an SNR of 0 decibels and a slow fading rate will occur during a particular block or frame, then the block length selector 15 will search the tables and extract all SNRs less than 0 decibels, that is, the block length selector 15 will extract all negative number SNRs. Of these SNRs, the block length selector 15 will extract the SNR of −0.6326 for block length 8, the SNR of −3.6429 for block length 16, the SNR of −3.6532 for block length 32, the SNR of −0.2561 for block length 64, and the SNR of −0.3673 for block length 128. Assuming that the block length selector 15 will determine that the fading rate is slow enough to use the longest block length of 128 safely, the block length selector 15 will select the information rate of 57/128, which is in correspondence with the SNR of −0.3673 for block length 128. If a faster fading rate was predicted, then the block length selector 15 would select a shorter block length and information rate accordingly.

Tables 6 to 10 and FIG. 6 show the situation when hard-decision bounded-distance decoding (HD-BDD), for example, the Berlekamp-Massey algorithm, is employed instead of soft decision maximum-likelihood decoding (SD-MLD). The results shown in Tables 6 to 10 were obtained using the following well-known expression on the probability of a decoded word error:

$$P_\omega = \sum_{i=t+1}^{n} \binom{n}{i} p^i (1-p)^{n-i},$$

wherein $p = Q\left(\sqrt{\dfrac{2E_s}{N_0}}\right)$.

TABLE 6

Block Length 8 (HD-MLD)

| Information Rate | $E_s/N_o$ (dB) |
|---|---|
| 1/8 | 2.12 |
| 4/8 | 6.22 |
| 7/8 | 9.49 |

TABLE 7

Block Length 16 (HD-MLD)

| Information Rate | $E_s/N_o$ (dB) |
|---|---|
| 1/16 | −1.13 |
| 5/16 | 3.81 |
| 7/16 | 5.04 |
| 11/16 | 6.86 |
| 15/16 | 9.80 |

TABLE 8

Block Length 32 (HD-MLD)

| Information Rate | $E_s/N_o$ (dB) |
|---|---|
| 1/32 | −4.32 |
| 6/32 | 1.43 |
| 11/32 | 2.92 |
| 16/32 | 4.69 |
| 21/32 | 5.85 |
| 26/32 | 7.41 |
| 31/32 | 10.0882 |

TABLE 9

Block Length 64 (HD-MLD)

| Information Rate | $E_s/N_o$ (dB) |
|---|---|
| 1/64 | −7.52 |
| 7/64 | −0.37 |
| 10/64 | 0.41 |
| 16/64 | 1.22 |
| 18/64 | 1.63 |
| 24/64 | 3.04 |
| 30/64 | 3.54 |
| 36/64 | 4.12 |
| 39/64 | 4.77 |
| 45/64 | 5.55 |
| 51/64 | 6.52 |
| 57/64 | 7.90 |
| 63/64 | 10.36 |

TABLE 10

Block Length 128 (HD-MLD)

| Information Rate | $E_s/N_o$ (dB) |
|---|---|
| 1/128 | −10.51 |
| 8/128 | −1.83 |
| 15/128 | −0.98 |
| 22/128 | −0.12 |
| 29/128 | 0.32 |
| 36/128 | 1.74 |
| 43/128 | 2.00 |
| 50/128 | 2.26 |
| 57/128 | 2.83 |
| 64/128 | 3.13 |
| 71/128 | 3.45 |
| 78/128 | 4.18 |
| 85/128 | 4.59 |
| 92/128 | 5.06 |
| 99/128 | 5.60 |
| 106/128 | 6.26 |
| 113/128 | 7.10 |

TABLE 10-continued

Block Length 128 (HD-MLD)

| Information Rate | $E_s/N_o$ (dB) |
|---|---|
| 120/128 | 8.33 |
| 127/128 | 10.62 |

The decoder 21 of the receiver 20 must be in synchronization with the information received from the encoder 11. Therefore, the information from the channel state estimator 23 is transmitted not only to the channel state predictor 14 of the transmitter 10, but also simultaneously the channel state predictor 24 of the receiver 20. The channel state predictors 14, 24 both include the same algorithm, and so perform exactly the same calculations using the coefficients to reach exactly the same conclusions about predictions of the channel state. The channel state predictor 24 forwards its predictions to the block length selector 25, which operates in the same manner as the block length selector 25 to provide a schedule of codes to the decoder 21. The decoder 21 uses the schedule of codes to determine what block lengths to expect in the signal from the demodulator 22.

The encoder in the transmitter and the decoder in the receiver should not be confused with configuration for source en-/decoding, which is used for compressing the information from the source. However, such a source compression algorithm can be provided to compress the information from the source.

If the feedback channel is extremely reliable, then a compression algorithm can be provided in the receiver 20 to compress the weight and input vectors before transmitting them across the feedback channel 40. A decompression algorithm provided in the transmitter 10 would then decompress the information about fading and the weights from the LMS filter, and transfer this to the channel stat predictor 14.

FIG. 7 shows a broadcasting system 101 according to a second embodiment of the present invention. The broadcasting system 101 includes a broadcast transmitter 110, a monitor receiver 125, and a plurality of broadcast receivers 120. The broadcast transmitter 110 transmits a signal to the monitor receiver 125 and the broadcast receivers 120 across a communication channel 130 with noise and fading. Although only a single broadcast receiver 120 is shown in FIG. 7, the other broadcast receivers 120 of the broadcasting system 101 have the same configuration, so their explanation will be omitted.

The monitor receiver 125 includes a code schedule producer 126 that performs the functions of predicting the channel state and selecting block length described for the channel state estimator 23, the channel state predictors 14, 24, and block length selectors 15, 25 of the first embodiment. The code schedule producer 126 prepares a schedule of codes, which includes block length and information rate, and transmits it to the broadcast transmitter 110 across a highly reliable transmission channel, such as a fiber optic link 140.

The broadcast transmitter 110 includes an encoder 111 and a modulator 112. The encoder 111 receives the schedule of codes from the monitor receiver 125 and encodes the information from the source using the block lengths and timings designated in the schedule of codes. The encoder 111 also embeds decoding information in the encoded signal, for example, by adding information on code of a particular frame in the header of the frame. The modulator 112 modulates the encoded signal from a base band up to a carrier band and transmits it across the communication channel 130.

The broadcast receiver 120 includes a demodulator 122 and a decoder 121. The demodulator 122 receives and demodulates the signal from the transmitter 110 back down from the carrier signal to the base band. The decoder 121 uses the decoding information embedded in the signal to anticipate what code words will appear in the signal from the demodulator 22 at what timing.

While the invention has been described in detail with reference to specific embodiments thereof, it would be apparent to those skilled in the art that various changes and modifications may be made therein without departing from the spirit of the invention, the scope of which is defined by the attached claims.

For example, the embodiment described producing a group of codes with an integral relationship using extension. However, a variety of codes include block lengths that naturally have an integral relationship, without extension. For example, quasicyclic codes include blocks lengths having a natural integral relationship.

Also, the present invention is not limited to the code families mentioned in the embodiment, but could be applied to any linear block code.

The invention could be used in any type of communication system, such as a cellular communication system. In this case, the base station would receive its own transmitted signal to monitor the channel state, or a separate fixed or mobile receiver would be provided for monitoring the channel state.

Although, the embodiment describes determining channel conditions based on fading depth and fading rate, the channel conditions could be determined on a variety of different information contained in the transmitted signal.

Although the embodiment described the present invention applied to a system for communication across a wireless channel, the present invention could also be applied to a system for communication across a wire line channel instead. Although the SNR is usually less dynamic on a fixed line communication system than on a wireless communication system, there are still benefits to changing the block length according to the SNR in a fixed line system, and so there will be benefits to using block lengths that are integral multiples of each other.

The modulator and demodulator need not be provided to the system. In the typical sense, a modulator is for modulating a base band signal to a carrier frequency. A demodulator demodulates the signal back down to base band. Therefore, if the communication system 1 is a base band fixed-wire line communication system, then there is no need to provide a modulator or a demodulator. The modulator and demodulator serve as interfaces for converting base band information into pass band information. In this sense, any interface between encoded information and the transmission medium can be used instead.

Although the embodiment described the present invention as applied to block codes, the present invention could also be used with convolutional codes. In this case, the convolutional codes would need to be converted into block codes using termination. Zeros, in a number dependent on the number of information bits of the encoder, are appended after the information bits. However, termination reduces the error correcting capability of convolution codes. Also, the block lengths would have to be quite large, so channel state would have to be quite good, with very slow fading variation.

The channel state estimator 23 of the first embodiment can be replaced with the centralized code schedule producer 126 of the second embodiment. In this case, the channel state estimator 23 and the channel state predictors 14, 24 can be dispensed with. The modified channel state estimator 23 would produce a schedule of codes, which includes block length and information rate, and transmit the schedule of codes simultaneously to the encoder 11, via the feedback channel 40, and to the decoder 21. The encoder 11 would encode the information from the source using the block lengths and timings designated in the schedule of codes. The decoder 21 would use the schedule of codes to anticipate what code words will appear in the signal from the demodulator 22 at what timing. However, it should be noted that this configuration greatly increases the amount of information transmitted across the feedback channel 40.

What is claimed is:

1. A receiver for receiving a signal transmitted over a communication channel, the receiver comprising:
   a channel state predictor for receiving channel state information about a state of the communication channel and producing information about future conditions of the communication channel;
   a block length selector for receiving the information about future conditions of the communication channel, and for selecting block lengths that are selected from a group of block lengths having an integral multiple relationship, to produce a schedule of block lengths;
   an interface for receiving the signal from the communication channel;
   a decoder for receiving the signal from the interface and the schedule of block lengths produced by the block length selector, and for decoding the signal using the schedule of block lengths; and
   a channel state estimator for assessing the state of the channel based on the signal from the communication channel, and for producing the channel state information accordingly.

2. A communication system for performing transmission and reception of a signal over a communication channel, the communication system comprising:
   a channel state estimator for assessing a state of the communication channel, and for producing channel state information accordingly;
   a channel state predictor for receiving the channel state information about a state of the information channel and producing information about future conditions of the communication channel;
   a block length selector for receiving the information about future conditions of the communication channel from the channel state predictor, and for selecting block lengths that are selected from a group of block lengths having an integral multiple relationship, to produce a schedule of block lengths;
   a transmitter including:
   an encoder for receiving information from a source, for receiving the schedule of block lengths from the block length selector, and for encoding the information from the source into an encoded signal using the schedule of block lengths; and
   a transmission interface for transmitting the encoded signal over the communication channel; and
   a receiver including:
   a reception interface for receiving the encoded signal from the transmission interface over the communication channel; and
   a decoder for receiving the encoded signal from the reception interface, for receiving the schedule of block lengths produced by the block length selector, and for decoding the signal using the schedule of block lengths,
   wherein the channel state estimator is provided in the receiver, and the channel state predictor and the block length selector are provided in both the transmitter and the receiver, the channel state estimator sending the channel state information to the channel state predictor in the transmitter over a feedback channel, and sending the channel state information to the channel state predictor in the receiver.

3. The communication system as claimed in claim 2, wherein the block length selector assembles the block lengths in the schedule of block lengths in frames, each frame totaling a maximum block length.

4. A method of receiving a signal transmitted over a communication channel, comprising the steps of:
   receiving channel state information about a state of the communication channel;
   selecting block lengths that are dependent on the channel state information and that are selected from a group of block lengths having an integral multiple relationship, to produce a schedule of block lengths;
   receiving the signal from the communication channel;
   decoding the signal using the schedule of block lengths; and
   assessing the state of the channel based on the signal from the communication channel, and producing the channel state information accordingly.

* * * * *